Figure 1:
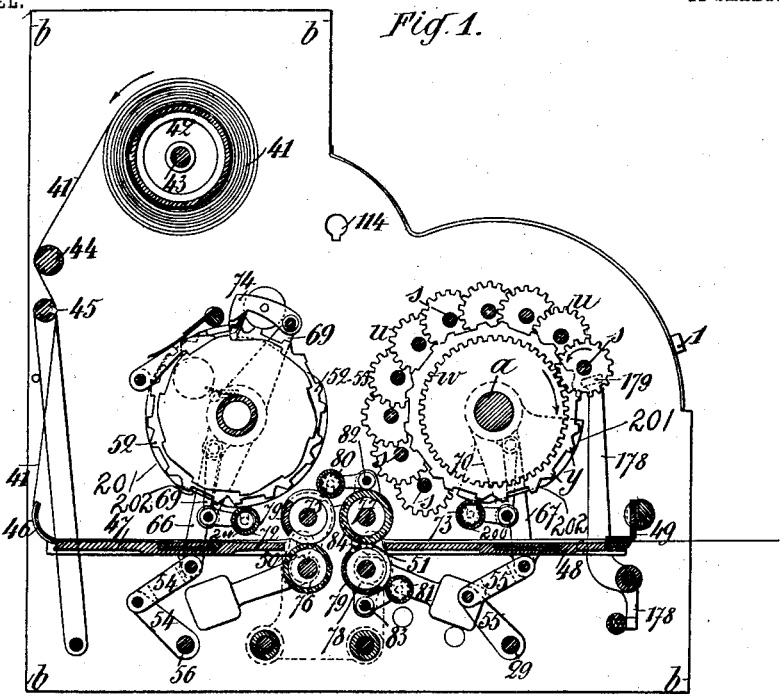

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 1.

WITNESSES:

INVENTOR
JULES FRYDMANE
BY
Howson and Howson
HIS ATTORNEYS.

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 2.
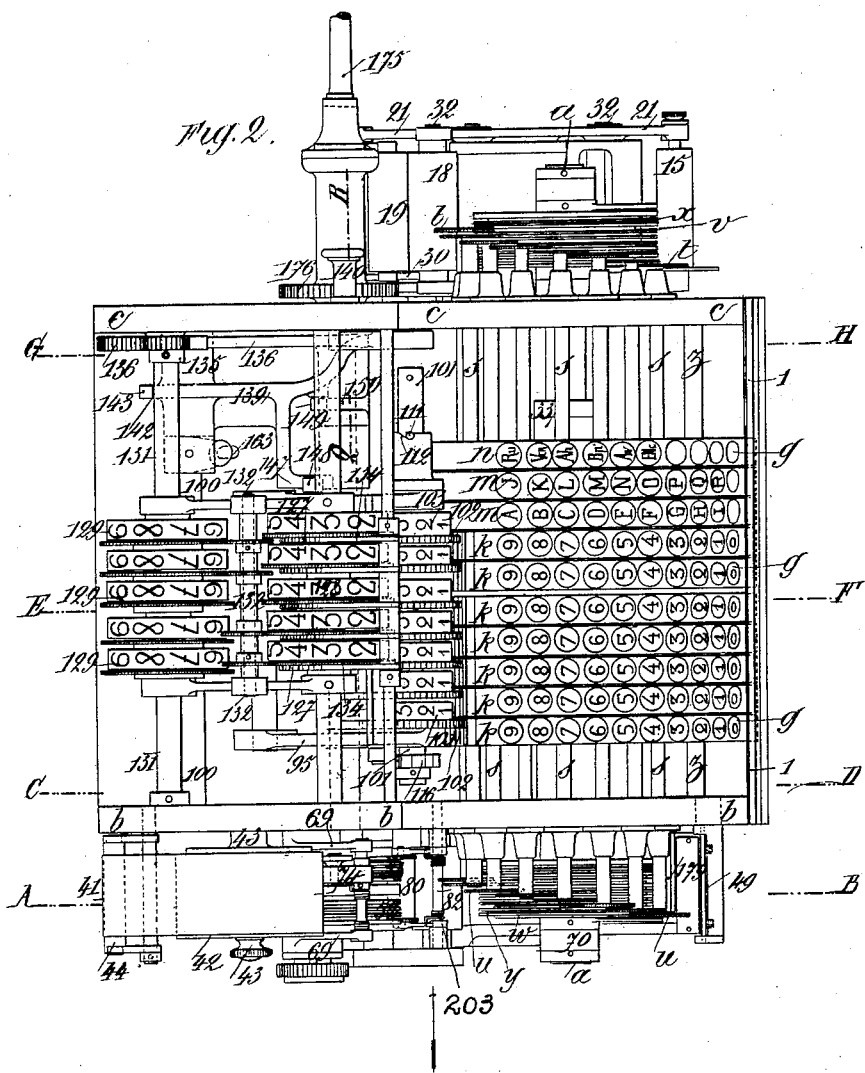

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 3.
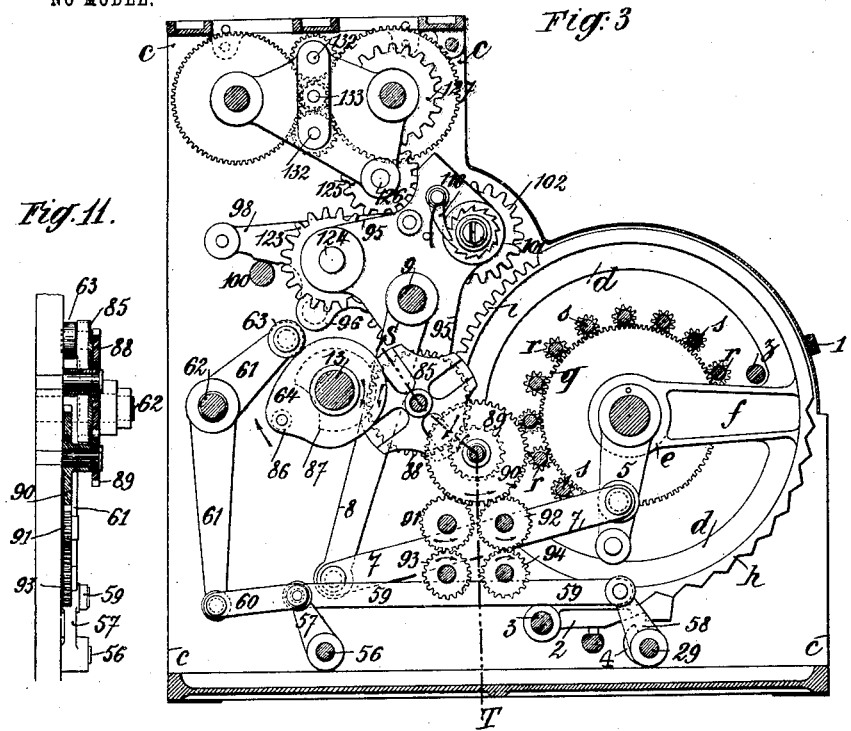
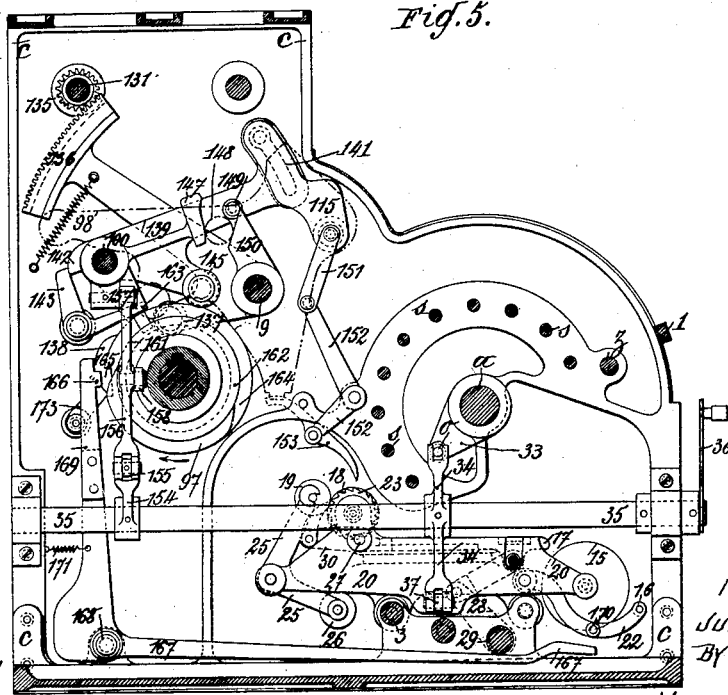
INVENTOR
JULES FRYDMANE
BY
Howson and Howson
HIS ATTORNEYS
WITNESSES

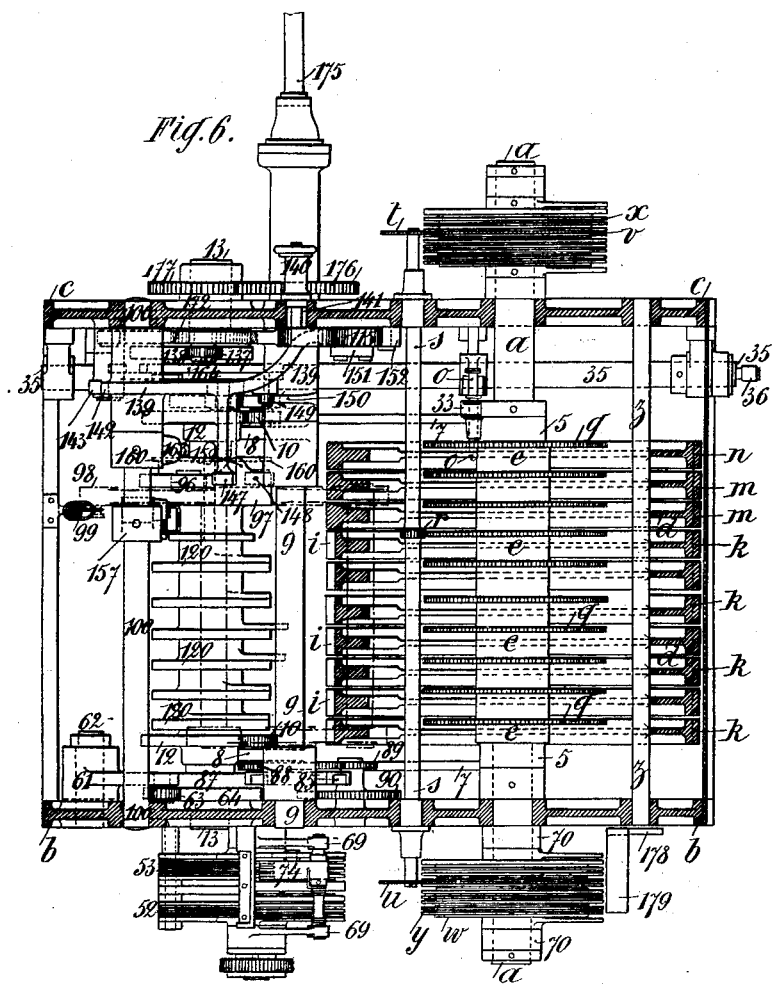

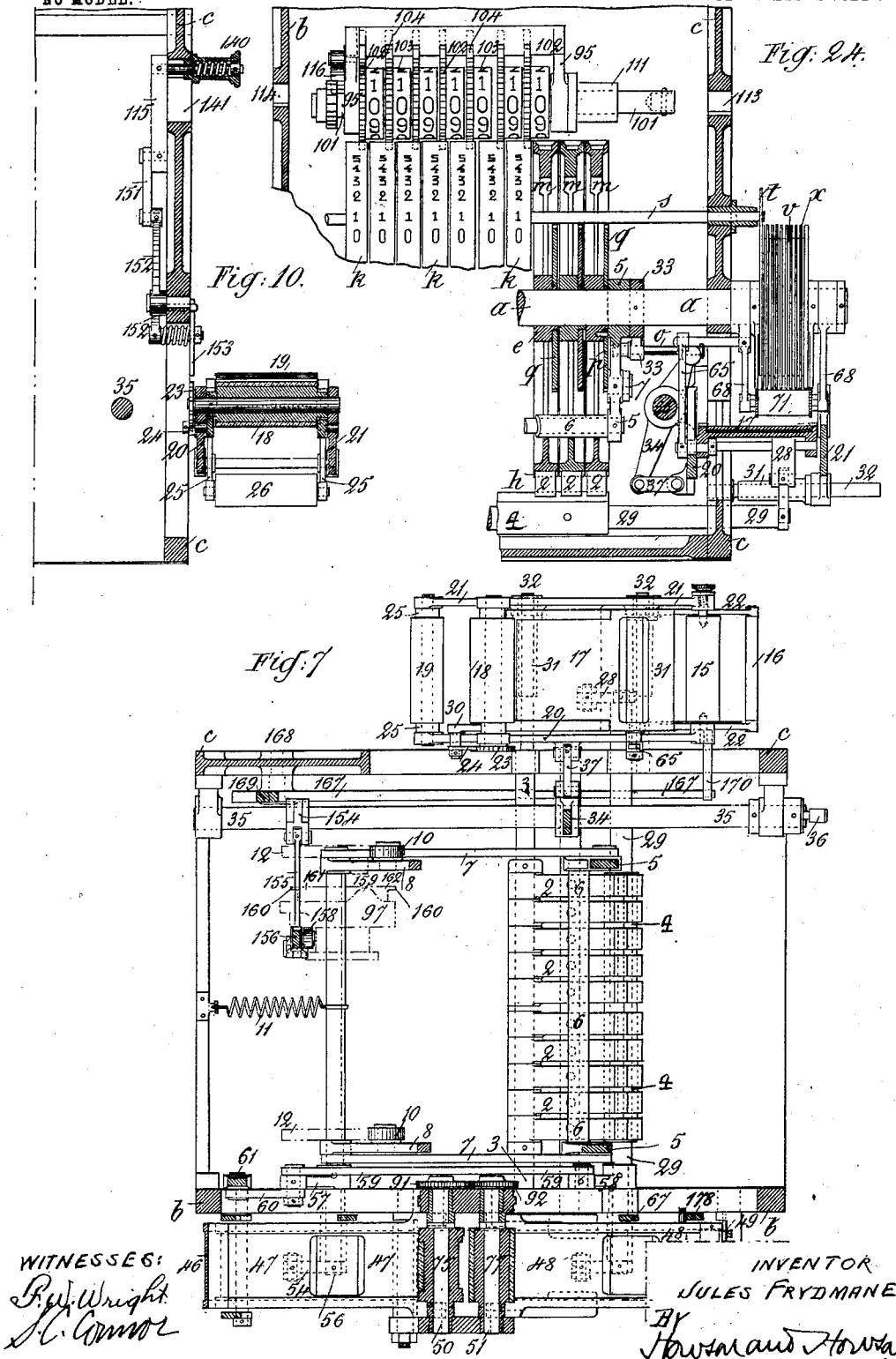

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 6.

WITNESSES:
F. W. Wright
S. C. Connor

INVENTOR
JULES FRYDMANE
BY Howson and Howson
HIS ATTORNEYS.

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 7.
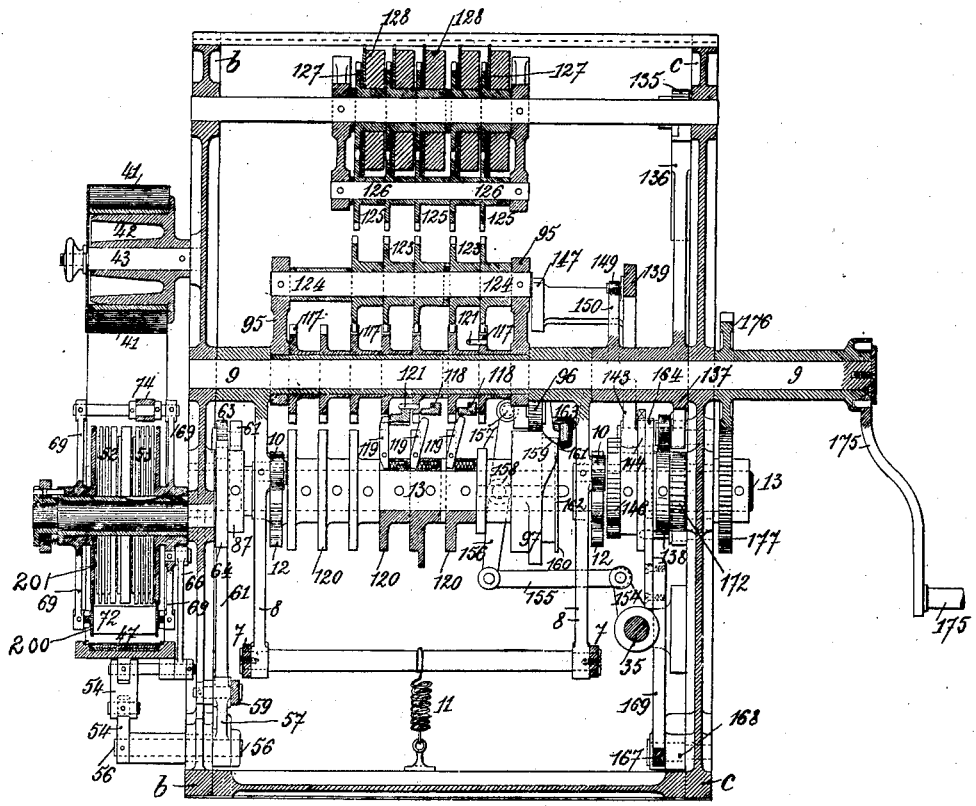
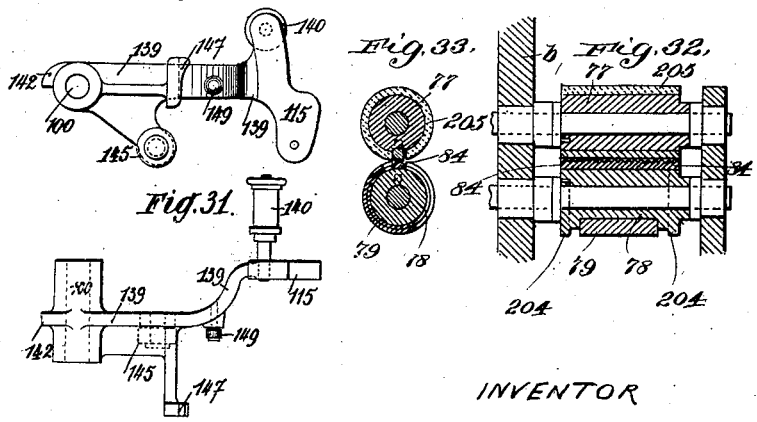
INVENTOR
JULES FRYDMANE
BY Howson and Howson
HIS ATTORNEYS
WITNESSES:

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 8.

WITNESSES:
P. W. Wright
S. C. Connor

INVENTOR
JULES FRYDMANE
BY
Howson and Howson
HIS ATTORNEYS.

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 9.

WITNESSES:

INVENTOR
JULES FRYDMANE
BY
Howson and Howson
HIS ATTORNEYS

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 10.

WITNESSES:

INVENTOR
JULES FRYDMANE
BY
HIS ATTORNEYS

No. 738,670. PATENTED SEPT. 8, 1903.
J. FRYDMANE.
APPARATUS FOR REGISTERING MONETARY TRANSACTIONS.
APPLICATION FILED SEPT. 21, 1901.
NO MODEL. 11 SHEETS—SHEET 11.
*Fig. 26.*     *Fig. 27.*     *Fig. 28.*
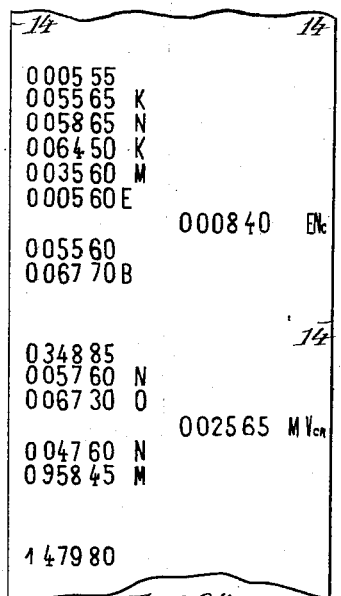
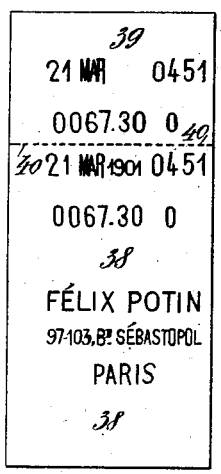
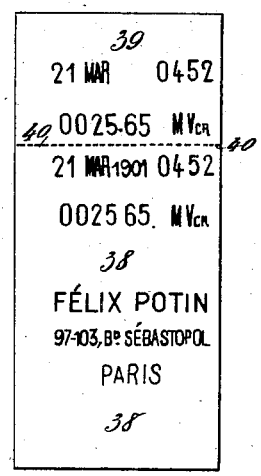
*Fig. 25.*     *Fig. 29.*
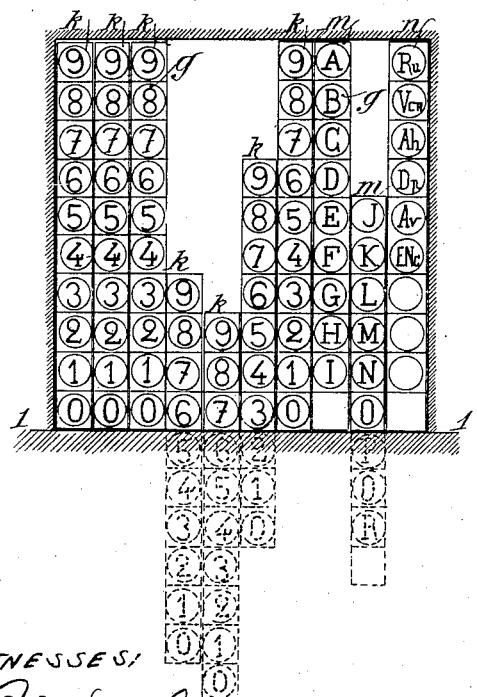
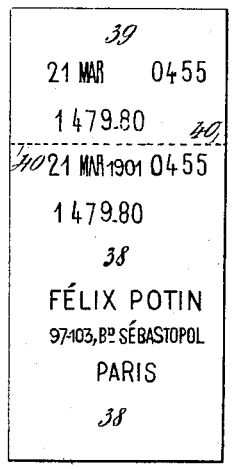
WITNESSES:
F. W. Wright
A. C. Connor
INVENTOR
JULES FRYDMANE
BY Howson and Howson
HIS ATTORNEYS No. 738,670. Patented September 8, 1903.

UNITED STATES PATENT OFFICE.

JULES FRYDMANE, OF PARIS, FRANCE, ASSIGNOR TO SOCIÉTÉ ANONYME DES APPAREILS DE CONTRÔLE ET DE COMPTABILITE AUTOMATIQUE, OF PARIS, FRANCE, A FIRM.

APPARATUS FOR REGISTERING MONETARY TRANSACTIONS.

SPECIFICATION forming part of Letters Patent No. 738,670, dated September 8, 1903.

Application filed September 21, 1901. Serial No. 76,027. (No model.)

*To all whom it may concern:*

Be it known that I, JULES FRYDMANE, a citizen of the Republic of France, residing at Paris, France, have invented Improvements in Apparatus for Registering Monetary Transactions, of which the following is a specification.

This invention relates to apparatus for registering monetary transactions which is extremely simple in construction, regard being had to the large number of operations involved. When one revolution is imparted to a crank, these operations are effected automatically in their proper order and with great certainty.

Apparatus according to this invention effects the following results:

First. The division of the commercial transactions into two categories, debit and credit, and the printing or registering of the said transactions, according to their nature, on the left or the right of a record-strip divided into two columns.

Second. The delivery for any transaction, whatever it may be, of a double ticket. Upon each portion of the ticket the apparatus prints the amount of the sum recorded, the designation of the employee who effects the transaction, the number of the transactions, and the full date. In the case of credit transactions the apparatus in addition prints upon the double ticket letters or signs indicating the nature of the transaction. All these indications, excepting the date and the number of the transactions, are reproduced on the record-strip.

Third. A visible indication of the correctness or otherwise of the setting of the apparatus and facility for the immediate correction of the setting in case of error.

Fourth. An indication, visible both to the operator and to the purchaser, of the amount of the transaction recorded, which remains visible until the next transaction is recorded.

Fifth. The adding up of the amount of the debit transactions recorded by the apparatus and printed upon the left-hand portion of the record-strip and the printing at any moment of this total upon the said strip and upon a double ticket. The impression of the total is separated from the previous impressions by a wider space than usual.

Figure 4:
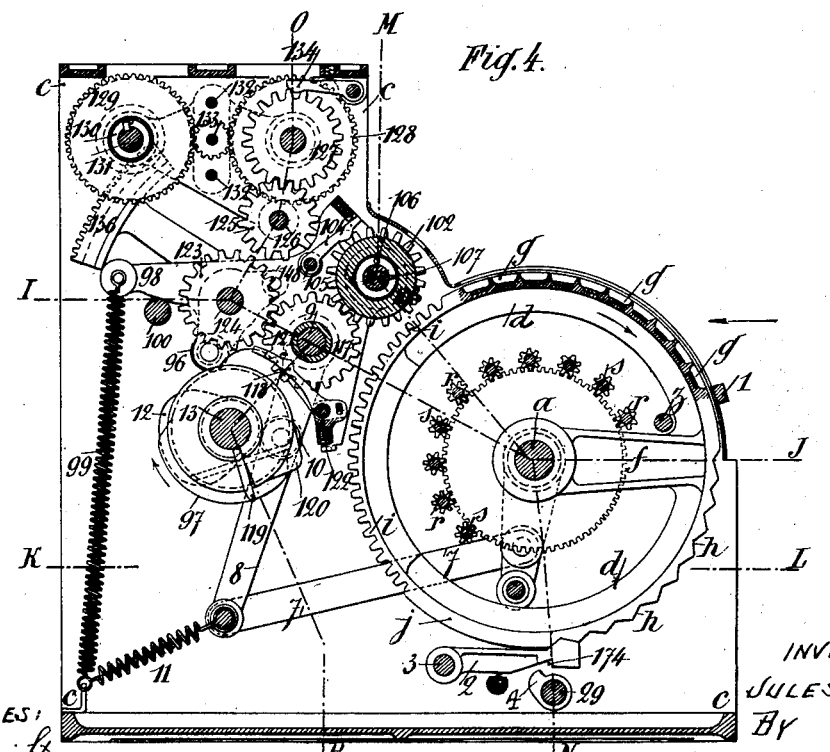
Figure 17:
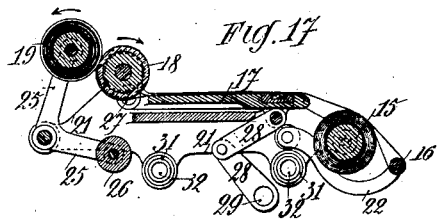
Figure 18:
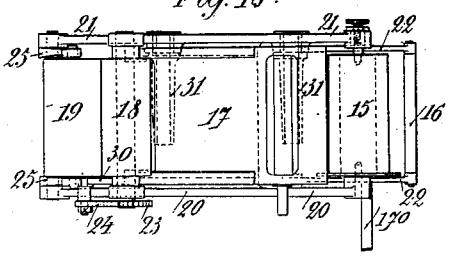
Figure 19:
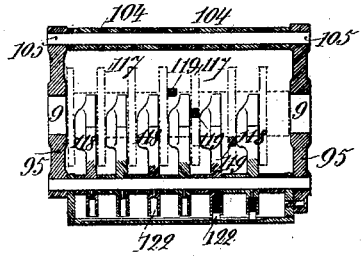
Figure 12:
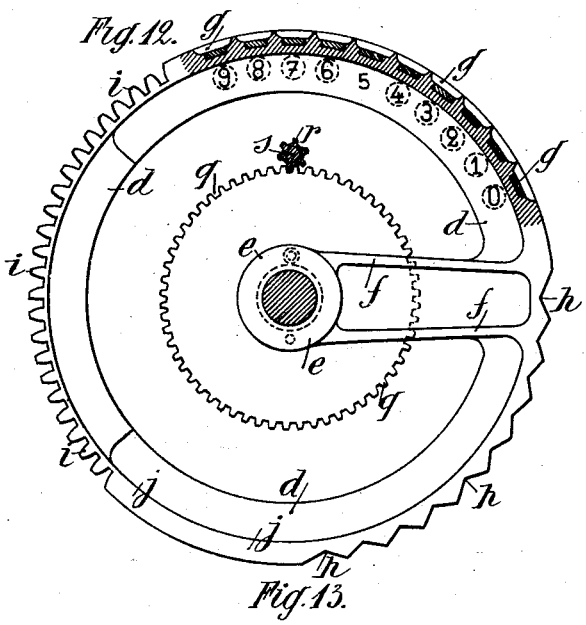
Figure 13:
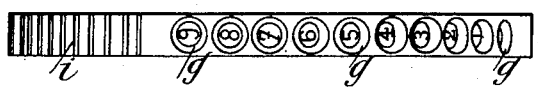
Figures 14, 15, 16:
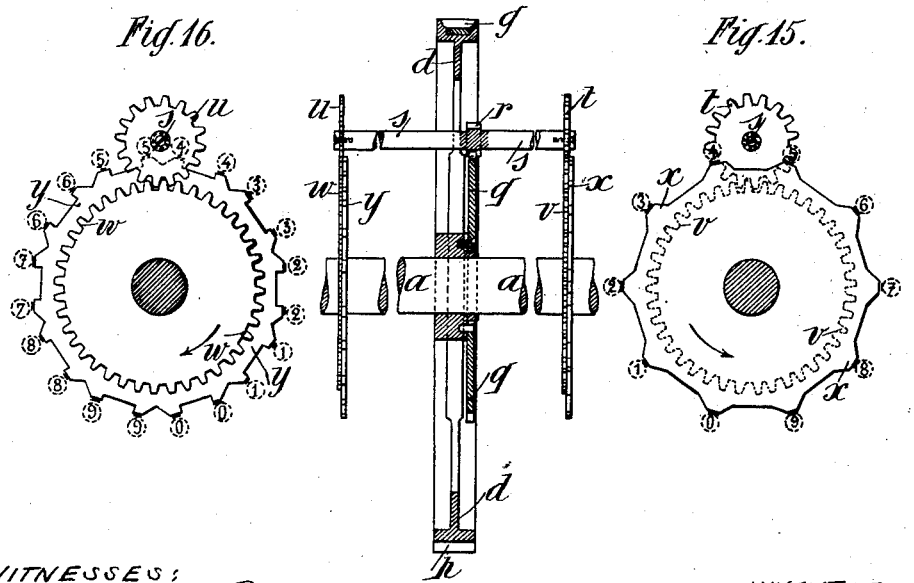
Figure 20:
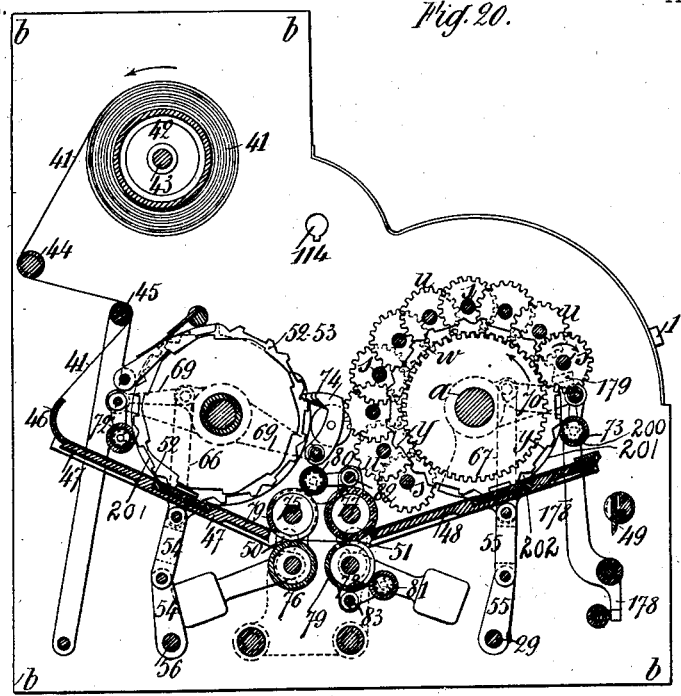
Figure 22:
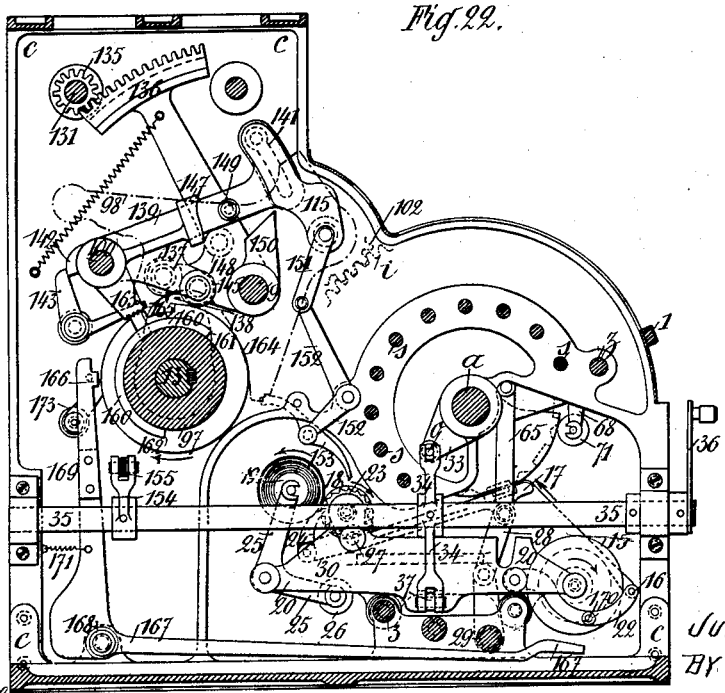
Figure 21:
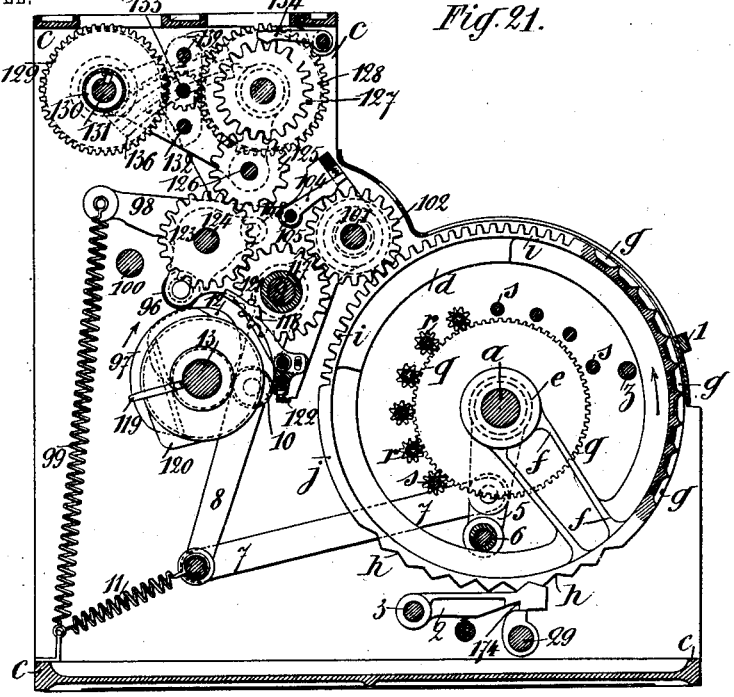
Figure 23:
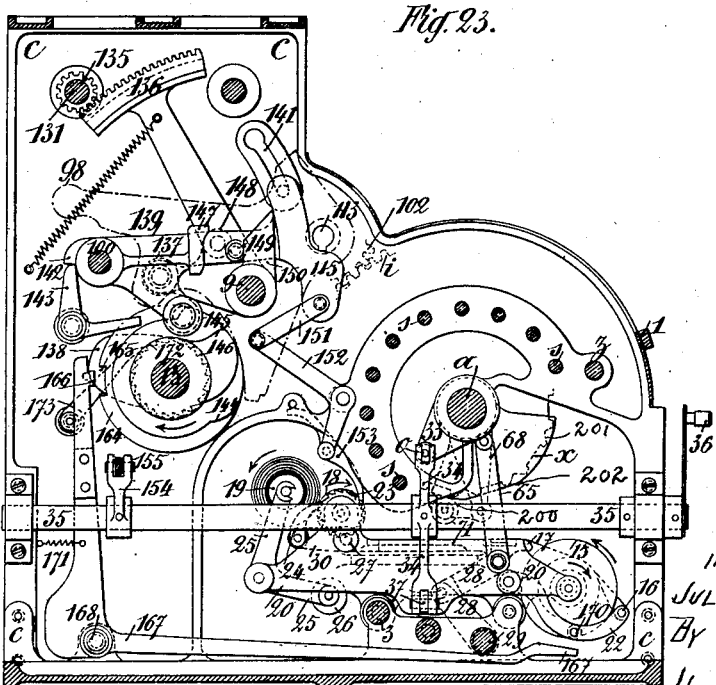

Figure 1 of the accompanying drawings is a section, corresponding to the line A B of Fig. 2, of an example of apparatus according to this invention. Fig. 2 is a corresponding plan. Figs. 3, 4, and 5 are sections corresponding, respectively, to the line C D, to the line E F, and to the line G H of Fig. 2, the direction of view being in each case that indicated by the arrow in Fig. 2. Figs. 6, 7, 8, and 9 are sections corresponding, respectively, to the dotted lines I J, K L, M N, and O P of Fig. 4. Fig. 10 is a section partly corresponding to the line Q R of Fig. 2. Fig. 11 is a section partly corresponding to the dotted line S T of Fig. 3. Figs. 12, 13, and 14 are respectively an elevation partly in section, a plan, and a transverse section of one of the composing-wheels, which is moved by the operator for the purpose of composing the amount of a debit or a credit and of putting the apparatus into a position to work. Fig. 14 shows at the same time the two printing-disks connected to the composing-wheel shown, one of the printing-disks being adapted to print the record-strip and the other to print the double tickets. Fig. 15 is an end view of the group of printing-disks with single characters. Fig. 16 is an end view of the group of printing-disks with double characters. Figs. 17 and 18 are respectively a longitudinal section and a plan of the carriage for the record-strip. Fig. 19 is a view showing separately several of the parts of the adding device. Figs. 20, 21, and 22 are sections similar to Figs. 1, 4, and 5, but showing the parts after operation. Fig. 23 is a view similar to Fig. 22, but showing the parts in other positions. Fig. 24 is a partial section corresponding to Fig. 8, but showing the parts after operation. Fig. 25 illustrates diagrammatically the working of the composing-wheels. Fig. 26 shows separately a portion of the registering-strip with several examples of impressions made thereon. Figs. 27, 28, and 29 show three double tickets which have been printed by the apparatus and of which the contents are repeated on the registering-strip; and Figs. 30 and 31 are respectively an elevation and a plan of the adding-lever. Fig. 32 is a longitudinal section, and Fig. 33 is a cross-section, of the rollers 77 and 78.

Figure 8:
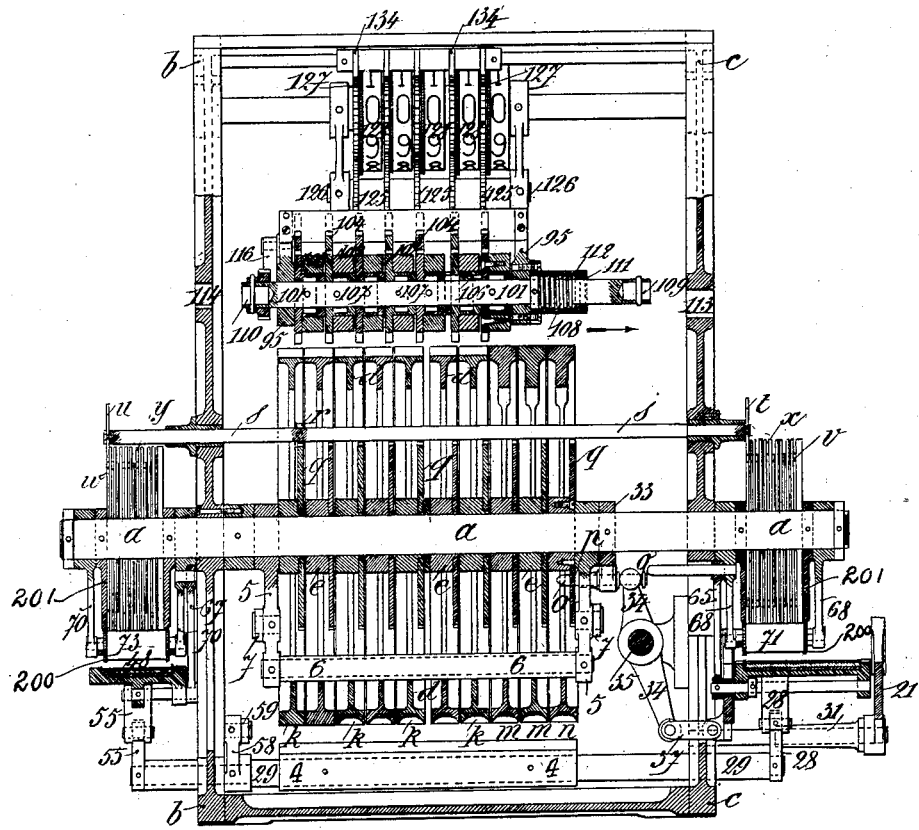

As shown in Figs. 2 and 8, there are in the apparatus, arranged side by side and loosely mounted on a transverse stationary shaft $a$, supported by the side frames $b$ and $c$ of the machine, a certain number of wheels (herein called "composing-wheels") whereby the apparatus can be set. Each of these wheels comprises a ring $d$, connected to a boss $e$ by means of a single arm $f$. Its periphery has circular recesses $g$, Figs. 12, 13, and 14, triangular notches $h$, teeth $i$, and a smooth portion $j$. The set of circular recesses and the set of triangular notches, which in the example are ten each, subtend equal angles.

Each of the circular recesses $g$ is provided with a number, letter, or other sign corresponding to the position of the wheel to which it belongs. Thus for the wheels (seven in number) indicated by the reference-letter $k$ the circular recesses are provided with numbers from "0" to "9," and for those (two in number) indicated by the reference-letter $m$ the circular recesses are provided with letters or initials, and for the single disk indicated by the reference-letter $n$ the circular recesses are provided with signs "Ru," "Vcr," or the like, corresponding to the expressions "Sold" and "Credit sale," &c.—that is to say, to transactions known in business under the name of "Credits or payments from the cash-box." It will be seen at once that the wheel $n$ is engaged by a pin $o$, that enters a hole $p$ in a toothed wheel $q$, which is fixed to the composing-wheel in question.

To each of the composing-wheels there is rigidly fixed a toothed wheel $q$, engaging with a pinion $r$, whose spindle $s$, which is parallel to the fixed shaft $a$, carries at its ends, outside the side frames $b$ and $c$, two pinions $t$ and $u$, respectively in engagement with toothed wheels $v$ and $w$, loosely mounted on parts of the fixed shaft $a$ outside the side frames of the apparatus. The toothed wheels $v$ and $w$ are respectively fixed to thin disks $x$ and $y$, on the peripheries of which there are formed characters reproducing exactly and in the same order the numbers, letters, or other signs of the circular recesses in the corresponding composing-wheels. The characters of the disks $x$ are single, Fig. 15, while those of the disks $y$ are double, Fig. 16. Each composing-wheel is therefore in engagement with two disks $x$ and $y$, (hereinafter called "printing-disks,") of which one is intended for printing the registering-strip and the other for printing the double tickets, for which it must have double characters. The printing-disks $x$ and $y$ form two distinct groups, one of which is located at the right hand and the other at the left hand of the group of composing-wheels.

The spindles $s$, that connect the disks with the composing-wheels, are arranged circularly around the fixed shaft $a$ and in such a way as to leave a sufficient space for the movement of the arms $f$ between the outside spindles $s$ to accord with the angle subtended by the group of circular recesses $g$ or that of the triangular notches $h$.

When the apparatus is at rest, the composing-wheels are in such positions that their arms $f$ abut against a fixed bar $z$, arranged in the interior of the wheels, and that the first of the circular recesses of each composing-wheel is located opposite to a fixed transverse bar $l$. This bar serves as an abutment for the finger of the operator while operating the composing-wheels. With the triangular notches $h$ of each of the composing-wheels there engages a detent 2, mounted on a transverse shaft 3 and acted upon by a spring adapted to hold it in engagement with the corresponding notch. The object of the detents 2 is to insure that the composing-wheels will remain in the positions in which they are placed by the operator. The detents 2 are triangular, and they have surfaces against which there bears at a certain moment an eccentric catch 4, which acts on all the detents and is fixed on a transverse shaft. The function of the catch 4 will be described later. The teeth $i$ engage at a certain moment with the wheels of a suitable adding device.

On the fixed shaft $a$ of the composing-wheels there are mounted loosely arms 5, connected together by means of a transverse bar 6 and connected by links 7 to levers 8, that oscillate on the shaft 9 and are provided with rollers 10, which bear, under the influence of spring 11, on cams 12, keyed on the cam-shaft 13. The bar 6 (herein called the "resetting-bar") occupies when at rest the position shown in Fig. 4. It is adapted to act, under the influence of the cams 12, on the arms $f$ of the composing-wheels, that have been more or less moved in setting the apparatus, and to return them all, no matter in what positions they may be, to their normal positions.

The record-strip, Fig. 26, is a strip of paper 14, on the left-hand portion of which there is printed in columns the debits or receipts, while the right-hand portion is reserved for the payments or credit transactions, which are also placed in columns. The record-strip is mounted on a carriage, Figs. 5, 7, 17, and 18, located below the printing-disks $x$. It is unwound from a reel 15, passes over a tension device 16, over an oscillating table 17, and under a feed-roll 18, and is finally wound on a reel 19.

The supply-reel 15 is mounted on pivots between two side frames 20 and 21. The tension device 16 is mounted to rotate at the ends of two levers 22, which oscillate on the said side frames.

The feed-roll 18 is mounted on a shaft that rotates in the side frames 20 and 21 and of which one of the ends carries a ratchet-wheel 23, with which a pawl 24 engages at the proper time for the purpose of rotating the roll 18 and feeding the record-strip.

The winding-up reel 19 is mounted at the ends of levers 25, which are mounted on the side frames 20 and 21 to oscillate and of which the free arms are provided with a counterweight 26, which causes the reel 19 to bear on the rotating feed-roll 18, whereby the reel 19 is caused to rotate and wind up the record-strip.

The oscillating table 17 is mounted on pivots 27 between the side frames 20 and 21. It is supported by a toggle-joint 28, connected at one end to the table 17 and fixed at the other end on the transverse shaft 29, which by its rotation at the proper time causes the toggle-joint to move and raise the table in such a way as to press the strip of paper located thereon against the printing-disks $x$.

The table 17 has an extension 30, to the outer end of which there is connected a pawl 24, so that each time the table oscillates the ratchet-wheel 23 is moved forward—for example, by one tooth—and thus effects the rotation of the feed-roll 18.

The side frames 20 and 21 of the carriage are suitably stayed in such a way as to form a rigid frame, and one of them, 21, carries sockets 31, which are mounted with slight friction on rods 32, rigidly attached to the side frame $c$ of the apparatus. This method of mounting enables the carriage to be moved transversely, so as to subject to the action of the printing-disks $x$ either the right-hand portion or the left-hand portion of the registering-strip that passes over the oscillating table 17. It will be seen that the record-strip can receive from the printing-disks $x$ two columns of print, corresponding, for example, on the left hand to the debits and on the right hand to the credits.

The movement of the carriage of the record-strip is intimately connected with the liberation of the composing-wheel $n$, which contains the figures relating to the credits. It has been seen that the composing-wheel $n$ is engaged when at rest by a pin $o$, that passes through a hole $p$ in the toothed wheel $q$, which is fixed to the wheel in question. The pin $o$ is guided by an arm 33, rigidly fixed to the shaft $a$, and is mounted on a lever 34, which is attached to a longitudinal shaft 35, which controls the apparatus at various points and has at the front of the apparatus a handle 36, which the operator moves to the right when he wishes to make a credit entry, but which when the operator ceases to act upon it is automatically moved to the left. The lever 34 is connected to the carriage by a link 37. When the pin $o$ liberates the composing-wheel $n$, the carriage is simultaneously moved toward the left, so as to present the right-hand portion of the record-strip to the action of the printing-disks $x$.

The double tickets that receive the impression of the other group of printing-disks $y$, Figs. 27, 28, and 29, have each a main portion 38 and a counterfoil 39, separated by a line of perforations 40, which enables them to be detached, so that the counterfoil can be kept, for example, for the cash-box and the main portion be given away, for example, to the customer. These two parts are each printed with the same order-number and the same date and receive from the printing-disks $y$ the same impression by reason of the double characters of the disks $y$. The double tickets are made from a strip of cardboard which unwinds from a reel 42, Figs. 1, 2, and 9, loosely mounted on a shaft 43, attached to the side frame $b$ of the apparatus. This strip of cardboard passes around guides 44, 45, and 46 and bears on tables 47 and 48 with lateral flanges and finally passes fixed shears 49, adapted to sever it into tickets of a certain length. The two tables 47 and 48 are respectively mounted on hinges 50 and 51 in such a way as to oscillate in a manner similar to that of the table 17 of the registering-strip and to press at any desired time the strip of cardboard which they carry against the group of printing-disks $y$ and against two other groups of disks 52 and 53. The pressing of the strip against the disks $y$ is effected by the table 48, and the pressing of it against the disks 52 and 53 is effected by the table 47.

The disks 52 and 53 (herein called "dating-disks" and "numbering-disks," respectively) have, for the same reasons as the printing-disks $y$, their characters doubled, so as to print in duplicate for the production of the double tickets. The disks 52 are partially rotated by hand in order to change the date, while the disks 53 are moved automatically after each impression in order to change the number.

The tables 47 and 48 are supported, respectively, by toggle-joints 54 and 55, each connected at one end to the corresponding table and at the other end to a shaft 56 or 29, the latter being that on which is mounted the toggle-joint levers of the oscillating table 17 of the registering-strip.

The shafts 56 and 29 carry arms 57 and 58, connected by a link 59. The arm 57 is connected by a link 60 to a lever 61, that oscillates on a shaft 62 and of which the free end carries a roller 63 in engagement with a cam 64, mounted on a cam-shaft 13. The cam 64 simultaneously operates the three oscillating tables 17, 47, and 48, and thereby prints the registering-strip and a double ticket. The printing of the date and the number of the transaction is not effected on a ticket at the same time as the impression is made on that ticket by the printing-disks $y$, but is effected in advance, which does not effect the result.

The three oscillating tables 17, 47, and 48 are furthermore connected, respectively, by links 65, 66, and 67 to levers 68, 69, and 70, oscillating freely on the respective shafts of the corresponding disks $x$, 52, 53, and $y$. On these levers 68, 69, and 70 there are mounted, respectively, inking-rollers 71, 72, and 73, which are acted upon by springs 203, so as to bear constantly on the peripheries of the disks to be inked. Each of the inking-rollers has flanges 200 bearing on sectors 201, whose peripheries are concentric with those of the disks $x$, $y$, 52, or 53 and have depressions 202 such that the inking-rollers will bear only on the characters to be inked. (See Figs. 1, 2, 8, 20, and 23.) Furthermore, the levers 69 carry a pawl 74, which, as in the case of all numbering devices, acts at a certain time and in a known manner on the numbering-disks 53 for the purpose of effecting automatically at each upward movement of the table 47 the changing of the number of the transaction.

Between the tables 47 and 48 there are arranged two pairs of feed-rolls 75 and 76 and 77 and 78, through which the strip of cardboard 41 is led. The rolls 75 and 78 have flanges 204 acting as lateral guides to the strip 41, which is pressed between the rolls 75 and 76 and the rolls 77 and 78, the rolls 76 and 77 being covered with suitable compressible material 205, as leather. The rolls 75 and 78 have central grooves, so that the strip is gripped only at the edges, and at these parts the rolls may each be provided with type 79 of the same composition or of a different composition for the purpose of printing on the two surfaces of the strip any desired indication—for example, an advertisement or address. This type is inked during the rotation of the rolls by means of inking-rollers 80 and 81, mounted loosely on spring-arms mounted on fixed pivots 82 and 83. The roll 78 is provided in addition to the type 79 with a toothed saw-blade 84, which has its edge parallel to the axis of the roll 78 and is adapted to perforate a strip of cardboard at each revolution of the roll 78. The circumference of each feed-roll is equal to the length of a double ticket, and the lower rolls 76 and 78 are mounted eccentrically on their respective shafts and are each under the action of a counterweight for the purpose of exerting against the upper rolls 75 and 77 the pressure required for feeding the strip of cardboard. The upper rolls 75 and 77 are rotated from the cam-shaft 13 by means of transmission mechanism comprising a Geneva stop-wheel 85, having four concavities and operated by a roller 86 on the aforesaid cam 64. The wheel 85 makes one-quarter of a revolution for each revolution of the cam-shaft 13. The wheel 85 is held during its stoppages by means of a disk 87, provided with a single concavity and acting in an ordinary manner, and it is rigidly connected to a toothed wheel 88, engaging with a pinion 89, to which is fixed a toothed wheel 90, engaging with pinions 91 and 92, which are fixed on the upper rolls 75 and 77, which are thereby moved at the same speed. In their turn the rolls 75 and 77 rotate the lower rolls 76 and 78, which are provided with pinions 93 and 94, respectively, in engagement with the pinions 91 and 92.

The operation of making up by means of the composing-wheels the debit statements, which are reproduced by the printing-disks $x$ and $y$, so as to be printed simultaneously on the record-strip and on the double tickets, also affects the adding device, and like statements are shown through openings, so as to be visible to the operator and the customers, in order to enable the latter to check the amount of their purchases and to enable the operator to verify the correctness of his manipulation.

The adding device, Figs. 4, 8, 9, and 19, comprises a certain number of wheels mounted between two plates 95, which are adapted to oscillate on a fixed transverse shaft 9 and of which one is provided with a roller 96 in contact with a cam 97, keyed on the cam-shaft 13 for the purpose of imparting to the entire mechanism of the adding device an oscillatory movement about the said fixed shaft 9. At the rear end of one of the plates 95 there is an extension 98, constantly pulled by a spring 99 toward a rod 100, which serves as an abutment for the adding device in its position of rest. On the front parts of the plates 95 there is mounted a shaft 101, which can be moved longitudinally and on which there are mounted adding-wheels equal in number to the composing-wheels $k$ and placed opposite thereto. Each of these wheels comprises a toothed pinion 102 and a ring 103, which is rigidly fixed to the pinion 102, and on the periphery of which there are provided numbers from "0" to "9," inclusive. When the apparatus is in a state of rest, the pinions 102 are held by spring-catches 104, mounted on a rod 105, which serves as a stay for the plates 95, and the pinions 102 are not in engagement with the toothed portions $i$ of the composing-wheels opposite to which they are located. It is only when the adding device is moved forward that the engagement of these parts is effected. In an annular recess formed in the interior of each of the pinions 102 (except the right-hand one) there is a pin 106, which is fixed to the adjacent pinion and against which there may act a pin 107, fixed to the shaft 101, which is constantly pressed toward the left hand of the apparatus by a spring 108. The pins 106 and 107 are in engagement only when the shaft 101 is moved toward the right hand of the apparatus, as indicated by the arrow in Fig. 8. The movement in question is obtained by causing the shaft 101 to rotate by means of a key inserted into one or the other of the holes 109 and 110, formed at the ends of the shaft 101, and by means of a pin 111, which moves during this rotation on an inclined surface 112, formed at the end of a socket fixed on the corresponding plate 95. The key can enter the hole 109 or 110 only when it can pass through the opening 113 or 114, formed in the corresponding side frame of the apparatus. The hole 109 and the opening 113 are not opposite each other to admit the key except when the pinions 102 of the adding device are in engagement with the toothed portions *i* of the composing-wheels and when, moreover, the opening 113, which is normally covered by a shutter 115, has been uncovered for the purpose of enabling the operator to cause the composing-wheels to indicate the total registered by the adding device. The hole 110 and the opening 114 are opposite each other only when the adding device is disengaged from the composing-wheels, Fig. 8, and the operation of the key then has for object only to return the adding device to zero, for example, at the end of a day; but it must be understood that access to the opening 114 is permitted only to the chief of the establishment or his representative, as will be seen later. Furthermore, the shaft 101 can turn only in one direction in consequence of the spring-catch 116, arranged at one of its ends.

The pinions 102 of the adding device are constantly in engagement with the same number of toothed wheels 117, which are mounted on the shaft 9, Figs. 4, 6, and 9, and are only transfer-wheels, which act each in combination with an oscillating finger 118 and a pivoted tooth 119, mounted on a cam-plate 120, for the purpose of transferring to the mechanism of the adding device, a unit produced by the total revolution of the wheel of an immediately inferior number. All the cam-plates 120 are keyed on the cam-shaft 13, and their mounting is such that their raised portions are presented successively to their respective fingers. It will be seen that the cam-plates 120, combined with the wheels 117, number only six, while the wheels 117 are seven in number, that the first finger 118 is mounted between the first and second wheels 117 on the right hand, and that the first cam-plate 120, carrying a pivoted tooth 119, is on the same plane as the second toothed wheel 117. While in a state of rest the pivoted tooth 119, just mentioned, is outside the plane in question, Fig. 9. The finger 118 is provided with an enlarged portion which meets a pin 121 on the transfer-wheel 117 of the immediately lower order for the purpose of being depressed at each revolution of the wheel 117, just mentioned, while the finger 118 in question can be maintained in its highest and lowest positions by means of a spring-catch 122. The finger 118 has a doubly-inclined surface, Fig. 19, which is turned toward the corresponding pivoted tooth and is adapted when this finger is depressed to cause the pivoted tooth to come into engagement with the wheel 117 of an immediately superior order and to cause its disengagement under the influence of a spring which acts on one end thereof, Fig. 9. It is during this engagement that the wheel 117 of immediately superior order just referred to is moved forward by one unit. When this has been done, the cam of the corresponding plate 120 comes into contact with the finger 118, which it raises and places in its normal position of rest ready to be again acted upon by the corresponding pin 121. This transfer mechanism is known and is described here only for the purpose of making the description of the registering apparatus complete. It will be understood that other mechanism adapted to produce the same effect can be substituted for that described.

The five wheels 117, located on the right of the apparatus, are respectively in engagement with other wheels 123, loosely mounted on an axle 124, which acts as a stay for the plates 95 of the adding device, Figs. 4 and 9. The wheels 123 merely connect the transfer-wheels 117 of the adding device with the mechanism that communicates with the visible numbers located on the upper part of the apparatus and operates them. Normally, however, the connection in question is interrupted, as will be seen from Fig. 4.

The visible indicating mechanism in question is composed of five wheels 125, mounted loosely on an axle 126 and respectively in engagement with the toothed wheels 127, to each of which there is fixed a ring 128, whose periphery is provided with numbers from "0" to "9," inclusive. The numbers on the rings 128 constitute the visible figures for the operator.

The visible figures for the customers are located on the peripheries of rings 129, fixed, respectively, to sleeves 130, mounted loosely on a transverse shaft 131, which is temporarily fixed. The rings 129, whose numbers are seen and read in a direction opposite to that of the numbers on the rings 128, must be located in an inverse order in relation to the rings 128; but since the movement is transmitted from the one to the other the inversion is produced by means of intermediate parts arranged on three separate shafts 132 and 133 and in engagement, respectively, with toothed wheels fixed on the rings 128 and 129. These rings are held in position by spring-catches 134, acting on the toothed wheels 127, until the following operation of the apparatus, the rings 128 and 129 being returned to zero before indicating a fresh amount on its registration by the adding device.

The mechanism for returning the parts to zero comprises a pin 135, keyed on the shaft 131 and in engagement with a toothed sector 136, loosely mounted on the shaft 9 and provided with an arm carrying a roller 137, which is adapted to come into contact with and be raised by the raised portion of a cam 138, mounted on the cam-shaft 13. Under the influence of this cam the sector 136 passes from its normal position, Fig. 5, during which the numbers of the preceding operation remain visible, into the position indicated by Fig. 22. This movement has for object to cause the temporarily-fixed shaft 131 to rotate for the purpose of returning to zero all the rings 129, which are mounted thereon. This return is effected by means of keys mounted on the shaft 131 and adapted to act on pins on the sleeves 130 of the rings 129 during the rotation of the shaft. The return to zero of the rings 129 causes that of the rings 128 by means of the connection hereinbefore mentioned. Under the shaft 131 there is located the transverse shaft 100, on which can oscillate a lever 139, called the "adding-lever," Figs. 5, 30, and 31. On the forward end of this lever there is a part 115, which acts as a shutter to cover normally the opening 113. At this end there is fixed a spring-handle 140, by means of which the adding-lever may be moved on its shaft 100 for the purpose, for example, of uncovering the opening 113. The handle 140 passes through an arc-shaped opening 141 in the side frame $c$ of the apparatus, and it can be moved in this opening only when it is pulled outwardly, so as to disengage while compressing the spring a catch in engagement with a recess in the side frame.

On the rear portion of the adding-lever there is formed a hook 142, under which there can engage, when the adding-lever has been lowered for the purpose of uncovering the opening 113, Fig. 23, a catch 143, an extension of which is acted on by a cam 144, mounted on the cam-shaft 13.

The adding-lever 139 has an extension provided with a roller 145, which is adapted to come into contact with a cam 146, mounted on the cam-shaft 13, and to raise automatically the lever 139 when it has been depressed. The lever 139 is also provided on the left-hand side with a projection 147, adapted to act on a roller 148 on one of the plates 95 of the adding device for the purpose of oscillating the adding device about its shaft 9 on the depression of the lever 139, and thereby causing the engagement of the adding device with the toothed parts $i$ of the composing-wheels.

On the left hand of the adding device there is a roller 149, adapted to act when it is depressed on the inclined surface of an arm 150, fixed on the boss of the sector 136, which returns the visible figures to zero when the amount has been added up. The front portion of the adding-lever 139 is connected by means of a link 151 to a lever 152, which oscillates about a pivot on the side frame $c$ of the apparatus and carries a pawl 153, which when the adding-lever is in its normal position, Fig. 5, is located above the ratchet-wheel 18 for feeding the record-strip, but which when the adding-lever is depressed, Fig. 23, comes into contact with the ratchet-wheel 18 and causes it to rotate by an angular distance approximately double that which it is moved normally by the pawl 24. Under these circumstances the forward movement of the record-strip is increased so as to separate clearly the impression which it can then receive from the printing-disks $x$ from the preceding impressions.

It has already been seen that the longitudinal shaft 35 carries a handle 36, adapted to operate it and a lever 34. This shaft carries in addition an arm 154, connected by means of a link 155 to a lever 156, which oscillates about a fixed pin 157, mounted on the shaft 100, and carries a roller 158, which engages in an annular groove in the cam 97 for raising the adding device. The connection of the lever 156 with the arm 154 has for object when the operator moves the handle 36 toward the right to move the cam 97 in the same direction—i. e., to release the cam 97 from its roller 96—and thereby to suspend the action thereof with regard to the raising of the adding device. The cam 97 is provided with a lateral projection 159, Fig. 9, and with a circular projection provided with a flange 160, which is cut away opposite to the projection 159 from a point 161 to a point 162. When the apparatus is in its normal state, the flange 160 is not opposite to the pin 163, fixed to the shaft 100, so that the projection 159 can, when the cam 97 is moved toward the right, come under the action of the pin 163. When the cam-shaft 13 is rotated, the projection 159 comes into contact with the fixed pin 163, which moves toward the left the cam 97, which is thus returned automatically into engagement with the roller 96. At the same time by reason of the before-mentioned connection the handle 36 is also returned toward the left. The object of the flange 160 is to prevent the cam 97 from being accidentally disengaged from the fixed pin 163, and thereby to avoid mistakes in manipulation. As an additional safety device, the cam-shaft 13 is provided with a disk 164, which has in its periphery a notch 165, opposite to which there is a catch 166, fixed to a lever 169, which oscillates at 168 and has fixed to it a horizontal arm 167, which extends toward the front of the apparatus underneath a pin 170 on one of the levers 22, which support the tension device 16 of the registering-strip. A spring 171 tends constantly to pull the catch 166 away from the notch 165 in the disk 164. If by accident the registering-strip should be torn, the tension device 16 would fall by its own weight and by means of the pin 170 cause the lever 169 to oscillate in such a way as to bring the catch 166 into contact with the periphery of the disk 164, so as to engage at the end of the revolution of the cam-shaft 13 in the notch 165 to prevent the shaft 13 from being operated until the registering-strip has been put right. The cam-shaft 13 is also provided with a ratchet-wheel 172 in engagement with a spring-catch 173, so that the shaft 13 can be rotated only in the direction indicated by the arrows in the drawings. Each of the detents 2 for holding the composing-wheels in position is provided with a notch 174, with which the catch 4 engages when the detent 2 cannot reach the bottom of its notch $h$ for the purpose of stopping the operation of the apparatus.

From what has been said it will be seen that the cam-shaft 13 is provided with all the cams required for the operation of the apparatus and that when the composing-wheels have been suitably manipulated by the operator all that is required in order to effect all the operations is to rotate the cam-shaft one revolution. This may be effected by hand or mechanically. In the example the operation is effected by means of a crank 175, loosely mounted on a fixed shaft 9 and rigidly secured to a toothed wheel 176, which engages with a corresponding wheel 177, keyed on the cam-shaft 13. A suitable device is used for preventing the shaft 13 from making more than one revolution for each operation of the apparatus.

Before passing to the operation of the apparatus it will be well to recapitulate very briefly the nature and function of the several cams mounted on the shaft 13. These cams number fifteen—viz., the cam 64, which acts on the detents 2 and on the oscillating tables 17, 47, and 48; the disk 87, which, together with the roller 86, carried by the cam 64, acts on the Geneva stop-wheel 85 for the purpose of operating the feed-rolls 75 76 and 77 78 of the double-ticket cardboard strip; the cam 138, which acts on the rings with visible numbers "128" and "129," that retain the indication of the last debit, and causes them to move to zero for the purpose of preparing them to indicate the debit of the current operation; the cam 97, which acts on the adding device and places its wheels in engagement with the composing-wheels for the purpose of causing it to register the debit of the current operation; the two cams 12, which act on the resetting-bar 6, which causes the composing-wheels that have been manipulated by the operator in the current operation to be returned to their original positions and with them the printing-disks $x$ and $y$, which are connected therewith; the six cams 120, each of which operates by a unit a wheel of the adding device on a complete revolution of the wheel of immediately inferior order; the two cams 144 and 146, which act on the adding-lever for the purpose of bringing the wheels of the adding device into engagement with the composing-wheels when it is intended to cause the latter to indicate the total registered and to print it on the record-strip and on a double ticket, and the projection or cam 159, which, in combination with the fixed pin 163, moves the cam 97 and the handle 36, which is connected therewith, to the left after the printing of the total registered and causes the adding device again to register the total. The cam-shaft also carries the notched disk 164, which stops the apparatus when the record-strip breaks, and the ratchet-wheel 172, which prevents the cam-shaft from rotating in the reverse direction.

I will now explain the operation of the apparatus. All business transactions should be recorded by the apparatus. If a debit is in question, the operator who has charge of the apparatus indicates the amount of this debit by means of the composing-wheels $k$.

For a debit—for example, of "67.30"—the operator moves the wheels in question and places them in such a position, Fig. 25, that they show opposite to the transverse bar 1 the number "67.30." The operator also moves the wheel $m$ so as to place in line with the said number "67.30" one of several letters—for example, the letter "O"—corresponding to the name of the salesman. The new position given to the wheels $k$ and $m$ is insured, Fig. 21, by the detents 2, corresponding thereto, and the number they form is reproduced opposite to the oscilating tables by the printing-disks $x$ and $y$, which are connected with the composing-wheels and make corresponding movements, as has been hereinbefore described. When this has been effected, the apparatus is ready to work and the operator has only to cause the cam-shaft 13 to rotate, either by rotating the crank 175 through one revolution or by engaging the motor, which, as has already been indicated, must be adapted to be disconnected automatically after a complete revolution of the cam-shaft. The cams 64, 87, 138, 97, 12, and 120 then come into operation successively and produce the following effects: As regards the cams 144, 146, and 159 they rotate without producing any effect for the moment. The cam 64 operates, as has already been mentioned, the shafts 29 and 56 for the purposes of causing, on the one hand, the eccentric catch 4 to act on the detents 2, and thereby to insure the holding of the composing-wheels, Fig. 21, in their new positions, and, on the other hand, of raising simultaneously the oscillating tables 17, 47, and 48, Figs. 20 and 22, toward the printing-disks $x$ and $y$ and the dating and numbering disks 52 and 53. If by accident the composing-wheels have not been properly manipulated by the operator—that is to say, if the notches $h$ of these wheels are not exactly opposite to the detents 2—the eccentric catch 4 cannot bear on the flat portions of the detents 2. On the contrary, the catch 4 enters the notch 174 in the detents 2, which prevents any further movement of the shaft 13 until the composing-wheels have been placed in their proper positions. The raising of the oscillating tables can be effected only when this position is correct. During this upward movement the inking-rollers 71, 72, and 73 have been respectively moved over the printing and numbering and dating disks in such a way as to ink the type that are to print and which as regards the printing-disks $x$ and $y$ reproduce faithfully the statement indicated by the composing-wheels. The numbering-disks have been operated by the pawl 74, while the dating-disks remain fixed, since they require to be changed only once a day. Now since the table 17 carries the record-strip the latter receives a single impression of the statement from the printing-disks $x$—for example, of the debit "67.30" followed by the letter "O"—and it will be seen that the impression is produced on the left-hand portion of the record-strip—that is to say, in the column intended for the debits. At the same time the part of the double-ticket strip carried by the table 48 receives from the printing-disks $y$ a double impression of the statement formed thereby—for example, of the debit "67.30" followed by the letter "O"—while the part of the strip just mentioned carried by the table 47 receives the double impression from the numbering and dating disks, as has been hereinbefore described. The pawl 24, which is drawn back when the table 17 is raised, acts during the descent of the table 17 on the ratchet-wheel 23, so as to cause the feed-roll 18 to rotate and to move the record-strip on the table 17 in such a way that the strip is ready to receive the impression during the next operation of the apparatus. On the other hand, the table 48 on rising releases a spring-lever 178, provided with a blade 179, which engages between adjacent type on the printing-disks $y$ and holds them during the inking of the type that are to print. During printing the notched disk 87 holds the Geneva stop-wheel 85; but when the oscillating tables have been depressed the roller 86, carried by the cam 64, acts on the wheel 85 and operates the driving mechanism of the two pairs of feed-rolls 75 and 76 and 77 and 78. These rolls therefore move the double-ticket strip, as has been hereinbefore described, and raise at the end of the table 48 the double ticket that has just been printed, and thus place it in a position to be cut. The cam 64 has a slight projection intended to cause a slight supplementary lifting of the oscillating tables for the purpose of presenting to the shears 49 the projecting portion of the double-ticket strip and of detaching therefrom the double ticket which has just been printed and which is shown in Fig. 27. At the same time as the rolls 75 and 76 and 77 and 78 cause the movement of the double-ticket strip they print thereon any desired advertisement or the like, as has been mentioned above. Furthermore, the roll 78 perforates the cardboard strip with a transverse line of holes 40 for the purpose of enabling the two parts of the double ticket to be separated thereafter. The cam 97 acts immediately after the cam 64 and causes the adding device, Fig. 21, to oscillate about the shaft 9, so that the wheels 102 engage with the toothed parts $i$ of the composing-wheels and the toothed wheels 123 of the adding device come into engagement with the pinions 125, connected to the rings with visible figures "128" and "129." When this has been effected, the cams 12 come into operation and by means of the resetting-bar 6 return all the composing-wheels into their original positions. By means of this return movement the adding device is operated and is caused to add the debit—for example, "67.30"—to the sum previously registered; but it will be seen that the adding is effected only when the adding device finally returns to its original position under the influence of the spring 99 and the cams 120 of the transmission mechanism have successively played the part indicated above—that is to say, of moving by one unit one of the wheels 102 on the completion of a revolution of another of the wheels of an immediately inferior order. When the debit mentioned has been registered by the adding device, as has been hereinbefore described, the adding device by means of the wheels 117 and the train of wheels connected therewith moves the rings provided with visible figures "128" and "129" in such a way that this debit is reproduced thereby, so that it can be seen and verified by the customer and the operator. When the adding device has been returned to its original position, the composing-wheels are released, together with the rings provided with visible figures. The latter, however, remain in the positions previously imparted to them and retain them until the commencement of the succeeding operation, when they are returned to zero by means of the sector 136, which under the influence of the cam 138 passes from the position shown in Fig. 22 to the original position shown in Fig. 5. When it is a question of a credit transaction, the operator manipulates first the handle 36, which he moves toward the right, so as to disengage the composing-wheel $n$ and at the same time to move the registering-strip carriage toward the left for the purpose of bringing the right-hand column, or the column for the credits, under the action of the printing-disks $x$, Fig. 24. The movement of the handle 36 also slides the cam 97 toward the right on the cam-shaft 13 by means of the longitudinal shaft 35, and thereby prevents this cam from acting upon the roller 96. The adding device can consequently no longer be oscillated by the cam 97 on the subsequent rotation of the cam-shaft 13, when the cam 97 will bring its lateral projection 159 against the fixed pin 163, which will produce toward the end of the revolution of the cam-shaft 13 the backward movement of the cam 97, and consequently return the record-strip carriage and the handle 36 into their original positions, the carriage being thus automatically returned to the proper position for the debits. After having moved the handle 36 to the right, as stated, the operator moves the wheels $k$ for the purpose of indicating, as in the case of a debit, the sum in question—for example, "25.65." Furthermore, he operates the one or the other of the composing-wheels $m$ and also the composing-wheel $n$, which has just been released, for the purpose of placing in the same line as the figures indicating the sum in question the initials of the employee who has effected the transaction—for example, the employee "M"—and the indication of the nature of this credit—for example, the letters "Vcr," indicating a credit sale. The transaction, although it is not a payment from the cash-box, must nevertheless be printed on the right-hand portion of the registering-strip, so as not to be registered by the adding device, which registers only the debits. When these preparations have been completed, the operator causes the cam-shaft 13 to make one revolution. This causes the locking of the composing-wheels, the raising of the tables 17, 47, and 48, the printing of the registering-strip and the double-ticket strip, the feeding of the strips, and the return of the composing-wheels to their original positions in the same manner as for a debit transaction. The difference consists in that the sum indicated by the composing-wheels is not registered by the adding device, since the action of the cam 97 is suspended, and also in that the printing-disks $x$ print in the right-hand column of the record-strip, as shown in Fig. 26. On the other hand, the double ticket produced appears as is indicated in Fig. 28. The rings provided with visible numbers "128" and "129," which are returned to zero, as in the case of a debit, do not receive any movement from the adding device, since it has not been brought into engagement with the composing-wheels. At the end of the rotation of the shaft 13 the fixed pin 163 acts on the projection 159 and moves toward the left the cam 97, which comes again into engagement with the roller 96. At the same time the registering-strip carriage is moved back toward the right, the handle 36 is returned toward the left, and the disk $q$ is reëngaged by the pin $o$. When it is desired to stop the recording of items and to put the total on the registering-strip, the apparatus acts in the following manner: The composing-wheels are not manipulated by the operator. He takes hold of the handle 140 and slides it in the groove 141 in such a way that the forward portion or shutter 115 of the adding-lever, which moves downwardly, Fig. 23, uncovers the opening 113. At the same time the pawl 153, which is connected to the adding lever, engages with the ratchet-wheel 23 and causes it to rotate by two teeth, so as to move the registering-strip by a distance double that caused by the pawl 24 for the debits and the credits. On the other hand, the projection 147 of the adding-lever acts on the roller 148 of the adding device and causes it to oscillate in such a way that its wheels 102 engage with the toothed portions $i$ of the composing-wheels. The adding-lever is held down by the catch 143, which cannot be disengaged by the cam 144 except at the end of the revolution of the cam-shaft 13—that is to say, after the total has been printed on the record-strip. When this has been effected, the operator passes his key through the opening 113 and adjusts it in the hole 109 of the transverse shaft 101, to which he imparts, by means of this key, a rotary movement for the purpose of returning the wheels of the adding device to zero; but since these wheels are in engagement with the composing-wheels $k$ the latter are moved in such a way as to reproduce opposite to the transverse bar 1 the total—for example, "1,479.80"—registered by the adding device. It will be seen that the key in question can not be withdrawn until it has made a complete revolution, which insures the correctness of the operation. When the amount has been thus indicated, the operator causes the cam-shaft 13 to make a complete revolution for the purpose of producing the effects mentioned before with regard to the debits—that is to say, to hold the disks in position and raise the oscillating tables 17, 47, and 48, so that the impression is effected on the registering and the double-ticket strips and that these strips are moved by the desired amount and the composing-wheels are returned to their original positions. It will be seen that the return of the composing-wheels is preceded by the disengagement (by the catch 143) of the adding-lever, which, however, cannot return to its original position until the key has been removed from the opening 113. The return of the composing-wheels causes the total which has been obtained from the adding device to be again registered by the adding device. The record-strip indicates the total in question—for example, 1,479.80, as is shown in Fig. 26. The same is effected in the case of the double ticket shown in Fig. 29. Such is the operation of the registering apparatus in the principal cases that occur.

It will be understood that, if desired, a second adding device may be employed for adding the credit items and for printing the total thereof on the record-strip and on the double tickets.

Although I have shown and described a carriage for a record-strip, means for shifting said carriage to an adjusted position, and means for returning said carriage to its normal position upon each operation of the machine, I do not claim the same in this application, as that forms the subject of a divisional application filed by me July 17, 1903, Serial No. 166,035.

What I claim is—

1. In registering apparatus, the combination with printing mechanism and adding mechanism, of composing-wheels having each within its rim a toothed gear for operating the printing-disks, and having each a portion of its periphery provided with depressions for receiving figures or other characters and adapted to serve for operating it, another portion notched and another portion toothed to operate the adding mechanism, said composing-wheels being loosely mounted on a fixed shaft and capable each of independent movement, in combination with detents to act in conjunction with the notched portions of the said wheels.

2. In registering apparatus, a group of composing-wheels in combination with two groups of printing-disks placed one on each side thereof, each printing-disk having characters similar to those on the corresponding composing-wheel, the disks of one group having the characters doubled, and transmission mechanism connecting the composing-wheels and printing-disks, said transmission mechanism having its shafts arranged in a circle between the rims and the bosses of the composing-wheels, of which each rim is connected to the corresponding boss by an arm.

3. In a cash-register, the combination of a series of composing-wheels rotatable on a fixed shaft and having each on its periphery a series of figures or other characters, a toothed segment and a notched segment and carrying each within its rim a toothed gear, a group of printing-wheels corresponding to the composing-wheels, a series of spindles arranged circularly within the rims of the composing-wheels and connecting each one of the latter with one of the printing-wheels, adding mechanism carried by a tilting frame movable into and out of engagement with the toothed segments of the composing-wheels, detents engaging with the notched segments of said wheels, a cam-shaft and means operated thereby for locking the detents, actuating the printing mechanism, moving the adding mechanism into engagement with the composing-wheels, and restoring the latter to their normal positions, thereby operating the adding mechanism.

4. In a cash-register, the combination of composing-wheels having each on a portion of its periphery a row of figures or other characters, the wheels being independently rotatable on a fixed shaft so that any desired amount or statement can be brought into alinement on the composing-line, said wheels having each, on another portion of its periphery a toothed segment, two groups of printing-wheels one for printing a continuous record and the other for printing a delivery-ticket, transmitting mechanism connecting each composing-wheel with a printing-wheel in each group said transmitting mechanism consisting of a series of gears one for each composing-wheel and within the rim thereof, a series of spindles arranged circularly around said gears and carrying pinions engaging therewith and with the printing-wheels, visual indicator-wheels, actuating-gear therefor carried by a movable frame, and a cam-shaft and means operated thereby for locking the composing-wheels, causing strips of paper to be pressed against said printing-wheels, connecting the visual indicator-wheels with the composing-wheels and restoring the latter to their normal positions.

5. In a cash-register the combination of composing mechanism comprising composing-wheels having each a row of figures or characters and a toothed segment, two groups of printing-wheels and actuating mechanism connecting one composing-wheel with one of each group of printing-wheels, printing mechanism comprising an oscillating table for each group of printing-wheels, a paper strip and feed-rollers for each group, and a cutter for severing one of said strips, adding mechanism comprising adding-wheels and pinions for operating the same carried by a tilting frame, and operating mechanism for all the above parts comprising a rotatable shaft having a series of cams and connecting devices actuated by said cams to lock the composing-wheels, move the printing-tables against the printing-wheels, engage the adding mechanism with the toothed segments of the composing-wheels, and restore the latter to their normal positions.

6. In a cash-register, the combination of a group of composing-wheels bearing figures or characters on a portion of their peripheries, and teeth on another portion, two groups of printing-wheels of which one wheel in each has characters corresponding to one of the composing-wheels and is connected by suitable transmitting mechanism to follow its movements, the wheels of one group having each character doubled, adding mechanism movable into and out of engagement with the toothed portions of the composing-wheels, a rotatable cam-shaft and mechanism actuated thereby for locking the said composing-wheels, taking an imprint from each set of printing-wheels, engaging the adding mechanism with the toothed portions of the composing-wheels, and then restoring the latter to their normal positions.

7. The combination with composing-wheels independently movable, and printing-wheels controlled thereby, each of said composing-wheels having a toothed segment, of adding mechanism comprising totalizing-wheels and operating-pinions carried by a tilting frame, visual indicator-wheels normally disconnected from the adding mechanism, a cam-shaft, cams mounted thereon and means operated by said cams for locking the composing-wheels, engaging the adding mechanism therewith and with the visual indicator-wheels, restoring the composing-wheels, releasing them, and disconnecting the adding mechanism.

8. The combination with the composing-wheels, and adding mechanism disconnected therefrom, of means for normally engaging the adding mechanism with the composing-wheels, a group of printing-disks connected with the composing-wheels, a printing-table carrying a paper strip, a carriage for said table movable transversely, means for shifting the carriage and for preventing the engagement of the adding mechanism and composing-wheels when a record is printed with the carriage in its abnormal position.

9. The combination with a group of composing-wheels and a group of printing-disks each of which bears double characters and is connected to one of the composing-wheels, of a printing-table, means for feeding a strip of paper or cardboard and for perforating it transversely, shears at one end of the table, means for pressing the strip against the disks to produce a double ticket, and means for inking the disks.

10. The combination with a group of composing-wheels and two groups of printing-disks, one group having single characters, and the other group having double characters adapted to print two lines of identical numbers opposite and parallel to each other, both groups being connected with the corresponding composing-wheels, a printing-table and paper-feeding devices for each group of disks, and means for operating the printing-tables.

11. The combination with a group of composing-wheels, and two groups of printing-disks, having single and double characters respectively and connected with the corresponding composing-wheels, a printing-table and paper-feeding devices for each group of disks, means for operating the printing-tables and for severing at each operation the double ticket printed by the disks having double characters.

12. The combination with the composing-wheels, of a group of printing-wheels controlled thereby and having each double characters, a movable table over which moves a paper strip, means for feeding the strip, means for perforating or indenting it transversely, a cutter and means for moving the table to press the paper against the printing-wheels and for giving it a further motion to sever the imprinted portion by means of the cutter.

13. The combination of the composing-wheels including a normally locked credit-wheel, a group of printing-wheels one controlled by each composing-wheel, a printing-table movable laterally so as to print in either of two columns, adding mechanism, a cam-shaft having a cam for throwing the adding mechanism into engagement with the composing-wheels, means for releasing the credit-wheel, shifting the printing-table and simultaneously throwing said cam into an inoperative position, and means for restoring said parts to their normal positions, after an impression has been taken.

14. The combination with a group of composing-wheels and a group of printing-disks connected therewith, each disk having double characters, two additional groups of printing-disks for printing date and the number of the transaction respectively, two printing-tables, means for oscillating said tables, and means for changing the number of the transaction at each oscillation.

15. The combination with a group of composing-wheels each having its rim connected to its boss by a single arm, of adding mechanism, means for engaging the wheels of the adding mechanism with the composing-wheels after the latter have been manipulated to register a transaction, a resetting-bar acting upon said arms to restore the composing-wheels to their normal positions, and means for operating said bar.

16. The combination with a group of composing-wheels having each on one portion of its periphery figures or characters, on another gear-teeth, and on another notches said wheels being mounted loosely on a fixed shaft, a series of detents engaging the said notches, an eccentric catch for each detent, and means for moving said catches, whereby the detents are locked when the wheels have been properly set, and the movement of the apparatus is arrested when any of the wheels is not properly set.

17. The combination with the composing-wheels, and printing-wheels controlled thereby, of mechanism for printing from said wheels a record of each transaction, feed-rollers, adding mechanism on which the sum of the transaction is totalized, an adding-lever for moving the adding-wheels into engagement with the composing-wheels and for moving the feed-rollers of the printing mechanism an excessive distance, means for taking an imprint of the total registered by the adding device, and means for automatically restoring the adding-lever and the parts controlled thereby to their normal positions.

18. The combination with composing-wheels and two groups of printing-disks, of adding mechanism, an adding-lever, means for operating the adding-lever, mechanism for returning the adding-lever to zero, a resetting-bar and operating means therefor, and a camshaft and cams for operating the above-mentioned parts.

19. The combination with the composing-wheels and the printing-wheels controlled thereby, of the printing mechanism, including a tension device normally upheld by the paper strip upon which the imprint is made, a lever beneath said device adapted to be operated upon the fall of said device, a camshaft having a cam for operating the printing mechanism and having a notched disk and a projection on said lever adapted to engage said notched disk upon the breakage of the paper, whereby the operation of the machine is arrested until the paper is replaced.

20. The combination with composing-wheels, of an adding device comprising wheels mounted on a shaft movable longitudinally and having an opening for an operating-key to engage said shaft and to prevent its withdrawal before a complete revolution has been made, an adding-lever of which a part forms a closing device for said opening, and a handle for moving said lever so as to uncover said opening and bring the adding-wheels into engagement with the composing-wheels.

Signed at Paris, France, this 27th day of July, 1901.

JULES FRYDMANE.

Witnesses:
LEON FRANCKEN,
EDWARD P. MACLEAN.